United States Patent
Eilmus et al.

(10) Patent No.: US 7,766,291 B2
(45) Date of Patent: Aug. 3, 2010

(54) HANDSHOWER SLIDE BAR

(75) Inventors: Niels J. Eilmus, Sheboygan, WI (US); Randy S. Graskamp, Sheboygan, WI (US); John M. Wilson, Sheboygan, WI (US)

(73) Assignee: Kohler Co., Kohler, WI (US)

( * ) Notice: Subject to any disclaimer, the term of this patent is extended or adjusted under 35 U.S.C. 154(b) by 1141 days.

(21) Appl. No.: 11/406,637

(22) Filed: Apr. 19, 2006

(65) Prior Publication Data

US 2007/0245483 A1  Oct. 25, 2007

(51) Int. Cl.
- *A47B 96/00* (2006.01)
- *A47B 96/06* (2006.01)
- *A47K 1/00* (2006.01)
- *A47K 3/20* (2006.01)
- *A47K 4/00* (2006.01)
- *A47K 3/28* (2006.01)
- *E04G 3/00* (2006.01)
- *F16B 1/00* (2006.01)
- *A47F 1/10* (2006.01)
- *A47G 1/10* (2006.01)

(52) U.S. Cl. .............. 248/222.11; 248/230.1; 248/297.51; 248/316.1; 248/229.1; 4/567; 4/570; 4/605; 4/615; 4/604

(58) Field of Classification Search ........... 248/222.11, 248/222.12, 230.1, 297.51, 316.1, 316.7, 248/229.1; 4/567, 568, 570, 605, 615, 604, 4/606
See application file for complete search history.

(56) References Cited

U.S. PATENT DOCUMENTS

| | | | |
|---|---|---|---|
| 3,580,620 A | 5/1971 | Offenbroich | |
| 3,672,710 A | 6/1972 | Kroopp | |
| 4,174,822 A * | 11/1979 | Larsson | 248/75 |
| 4,271,543 A | 6/1981 | Martin | |
| 4,523,734 A | 6/1985 | Grohe | |
| 5,265,833 A | 11/1993 | Heimann et al. | |
| 5,318,263 A | 6/1994 | Bischoff et al. | |
| 5,481,765 A * | 1/1996 | Wang | 4/605 |
| 5,632,049 A | 5/1997 | Chen | |
| 5,749,552 A | 5/1998 | Fan | |
| 5,833,192 A * | 11/1998 | Buhrman | 248/295.11 |
| 5,857,225 A | 1/1999 | Bischoff et al. | |
| 6,024,331 A | 2/2000 | Bischoff et al. | |

(Continued)

FOREIGN PATENT DOCUMENTS

EP    0727530 A1    8/1996

(Continued)

OTHER PUBLICATIONS

Kohler Co. "K-9516 MasterShower 24" Shower Slide Bar". Online catalog. Undated, admitted prior art.

*Primary Examiner*—J. Allen Shriver, II
*Assistant Examiner*—Christopher Garft
(74) *Attorney, Agent, or Firm*—Quarles & Brady LLP

(57) ABSTRACT

A slide bar assembly is provided having slide bar supporting a bracket assembly that is suitable to retain a handheld showerhead. A brake assembly releasably couples the bracket assembly to the slide bar via a user-actuated trigger in order allow the user to adjust the height of the showerhead by pressing the trigger. The slide bar assembly further includes a wall mounting assembly that is configured to connect the slide bar to the shower wall.

19 Claims, 5 Drawing Sheets

U.S. PATENT DOCUMENTS

| | | | |
|---|---|---|---|
| 6,453,486 B1 * | 9/2002 | Chen | 4/605 |
| 6,473,916 B2 | 11/2002 | Schiodt | |
| 6,796,442 B1 | 9/2004 | Wu | |
| 6,802,089 B2 | 10/2004 | Cropelli | |
| 7,043,776 B1 * | 5/2006 | Wu | 4/601 |
| 7,407,140 B2 * | 8/2008 | Sen | 248/121 |
| 2006/0230520 A1 * | 10/2006 | Tsai | 4/567 |

FOREIGN PATENT DOCUMENTS

| | | |
|---|---|---|
| EP | 1211428 A1 | 6/2002 |
| EP | 1602787 A2 | 12/2005 |
| EP | 1614815 A2 | 1/2006 |
| EP | 1690486 A2 | 8/2006 |
| FR | 1229937 | 9/1960 |
| WO | 03059120 A1 | 7/2003 |

\* cited by examiner

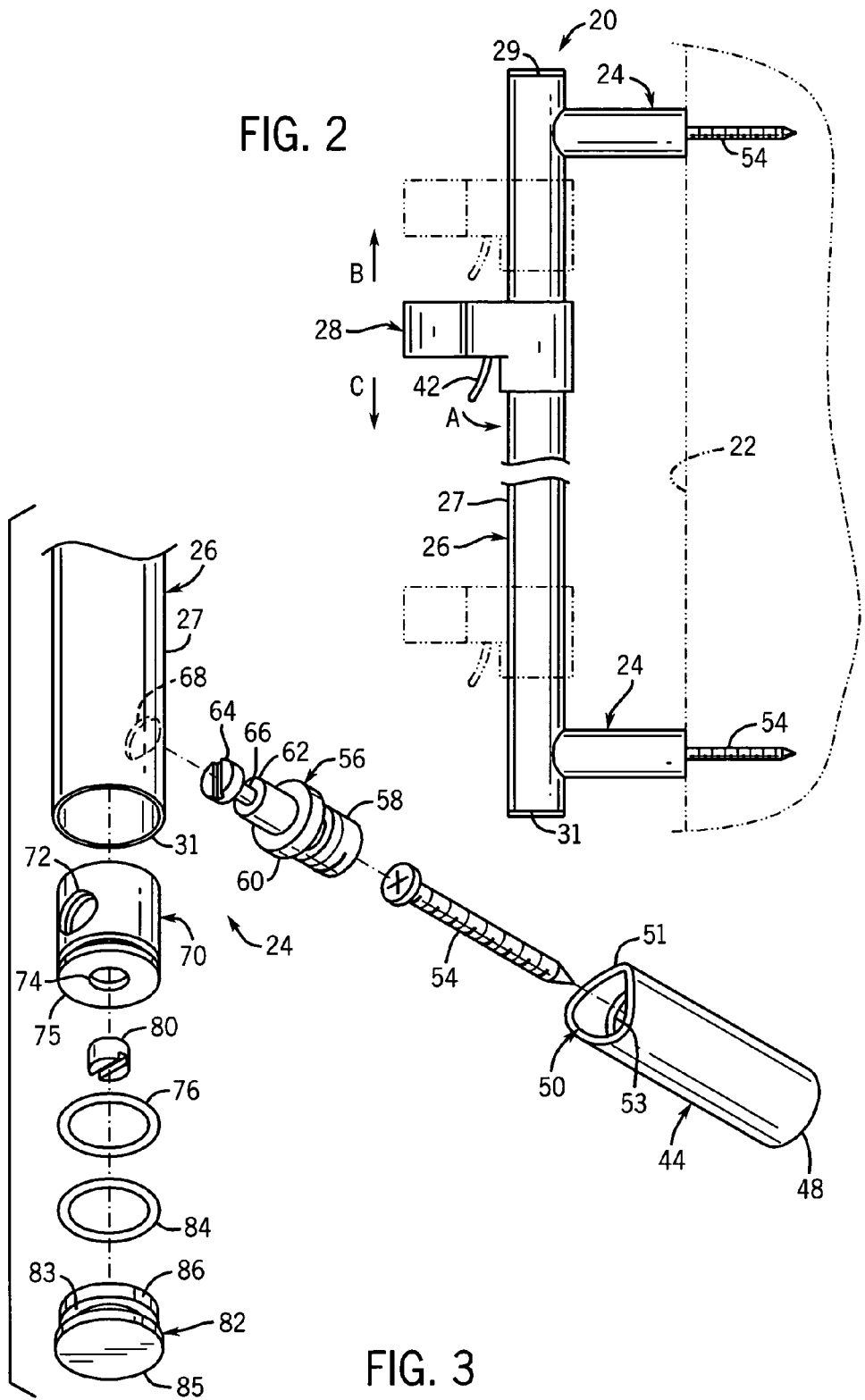

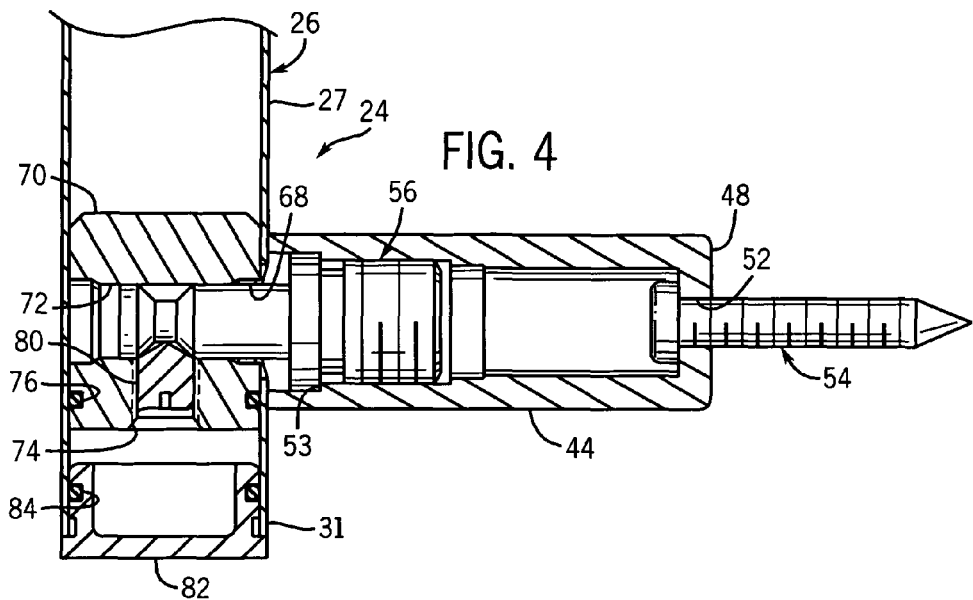
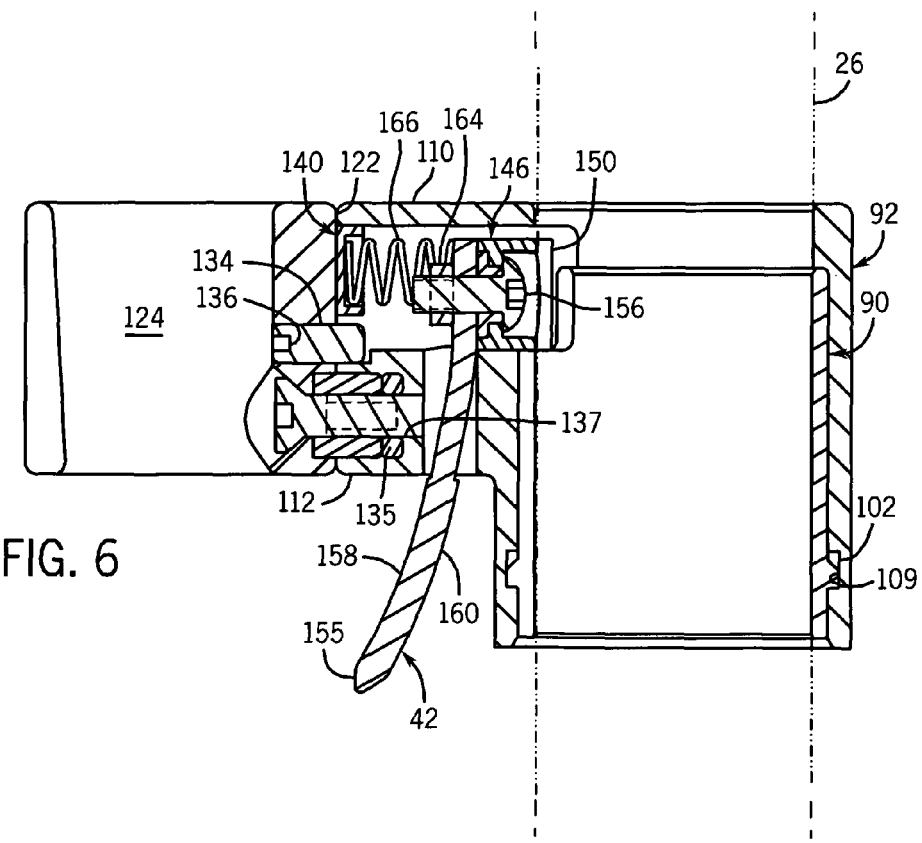

HANDSHOWER SLIDE BAR

CROSS-REFERENCE TO RELATED APPLICATION

Not applicable.

STATEMENT OF FEDERALLY SPONSORED RESEARCH OR DEVELOPMENT

Not applicable.

BACKGROUND OF THE INVENTION

The present invention relates to a shower-mountable slide bar, and in particular such a slide bar carrying a height-adjustable showerhead support bracket.

Fixed showerheads typically extend from a shower wall and direct a spray into the shower enclosure. Handheld showerheads provide for greater versatility. Some handheld showerheads are removably mountable on a support bracket mounted on the shower wall, and can thus be used as a "fixed" showerhead, or can be removed from the bracket by the user and handheld to direct the shower spray as desired.

Unfortunately, when the user wanted the handheld showerhead to function as a fixed showerhead, the height of the directed spray was also fixed. A fixed spray optimally directed to shower an adult would not be optimized for a child. As a result, brackets for such devices were developed that were slidably mounted to vertically extending rails (or slide bars) such that the vertical position of the bracket, and corresponding showerhead, could be set by the user. See e.g. U.S. Pat. Nos. 4,271,543; 5,265,833; 5,632,049; 6,453,486; and 6,802,089.

Such brackets typically include a releasable locking mechanism that can be disengaged by the user to adjust the spray head position, and subsequently reengaged to lock the spray head position. Unfortunately, some of these conventional slide bars are difficult to install on a shower wall, and/or the support brackets are difficult to use, are ergonomically deficient, and/or are complex to manufacture and assemble.

A need thus exists for a slide bar for a handshower that can be easily installed into a shower wall, and have a bracket slidably mounted to the bar whose position along the bar can more easily be adjusted and locked by the user.

SUMMARY OF THE INVENTION

In one aspect the present invention provides a slide bar assembly having a longitudinally extending slide bar supporting a bracket assembly that is suitable to retain a handheld showerhead. The bracket assembly includes a slider member receiving the slide bar. A clamp/holder is supported by the slider member and is configured to removably receive the showerhead.

A brake assembly is coupled to the slider member and includes 1) a brake pad biased against the slide bar under a biasing force to inhibit the slider member from translating longitudinally along the slide bar when in a brake position, and 2) a trigger having first end defining an actuating surface and a second end linked to the brake pad. The first end can be depressed to cause the second end to move the brake pad away from the slide bar, thereby freeing the slider member to translate longitudinally along the slide bar.

In one preferred form the slider member can receive a sleeve that is fixed with respect to longitudinal movement relative to the slider member, such that the sleeve receives the slide bar. The sleeve can define a pocket extending there through that is in alignment with the brake pad such that the brake pad engages the slide bar through the pocket.

In another preferred form the bracket assembly can include an block supported by the slider member such that the brake assembly is coupled to the block. The block can define a cutout extending laterally there through, such that the cutout receives the brake pad. At least one spring member, seated against a spring seat, can provide the biasing force. The spring seat can be retained by the clamp, which can be fastened to the block. The spring can be further seated against the second end of the trigger.

In still another preferred form the first end of the trigger can be actuated in a direction toward the slide bar to force the second end of the trigger away from the slide bar.

In accordance with another aspect of the present invention, a slide bar assembly is provided. The slide bar assembly has a slide bar suitable for supporting a removable handheld showerhead. The slide bar assembly includes a wall mounting assembly suitable for connecting the slide bar to a shower enclosure wall. The wall mounting assembly includes a sleeve mountable onto the wall, the sleeve having a first distal end disposable adjacent the wall and a second distal end disposed opposite the first distal end.

A connector is fastened to the sleeve a first connector end, and extends partially into the slide bar at a second connector end opposite the first connector end such that the second distal end is disposed adjacent the slide bar. A locking mechanism is disposed inside the slide bar. The locking mechanism is configured to fix the second connector end with respect to lateral movement relative to the slide bar.

In one preferred form of this embodiment the slide bar can have a substantially round outer surface and the second distal end of the sleeve can be curved to fit against the slide bar outer surface.

In another preferred form of this embodiment, the sleeve can include an inwardly extending step formed inside the sleeve, and the first connector end can be threadedly inserted into the step. The connector can further include a radial shoulder disposed adjacent the first connector end. The radial shoulder can be sized to abut the step when the connector is fully inserted in the sleeve. The shoulder can be recessed with respect to the second distal end of the sleeve when the connector is fully inserted in the sleeve.

In still another form of this embodiment, the slide bar can have an outer surface defining an aperture formed therein, and the locking mechanism can include a slug disposed in the slide bar. The slug can define a channel extending there through and aligned with the aperture. The second connector end can include a head sized to fit through the aperture and the channel.

The second connector end can include further comprises a neck disposed adjacent the head, and the locking mechanism can further include a set screw sized to engage the neck. The slide bar can have a hollow section, and the locking can be retained in the hollow section via an end cap assembly closing the hollow section.

The present invention therefore permits mounting of a handshower at a selected first fixed position, or alternatively mounting of the handshower at other fixed positions to accommodate different optimized heights for different users. The height of the handshower can be adjusted with an intuitively simple pressing motion which does not require substantial force. Specifically, no rotational force is required, and thus consumers who have health problems (e.g. arthritis) making twisting motions with their hands can more easily use this device.

The means of assembling the slide bar to the wall also has significant advantages. It requires few parts, and essentially hides the connection from view. Further, the parts are inexpensive to produce and require little time to assemble.

These and other advantages of the present invention will be apparent from the detailed description and drawings. What follows are merely preferred embodiments of the present invention. To assess the full scope of the invention the claims should be looked to.

BRIEF DESCRIPTION OF THE DRAWINGS

FIG. 2 is a side elevation view thereof, with modified vertical positions shown in dotted lines;

FIG. 3 is an exploded perspective view of a lower portion thereof;

FIG. 4 is a cross sectional view of the FIG. 3 portion once assembled;

FIG. 6 is a cross sectional view of the FIG. 5 bracket assembly once assembled.

DETAILED DESCRIPTION OF THE PREFERRED EMBODIMENTS

Figure 1:
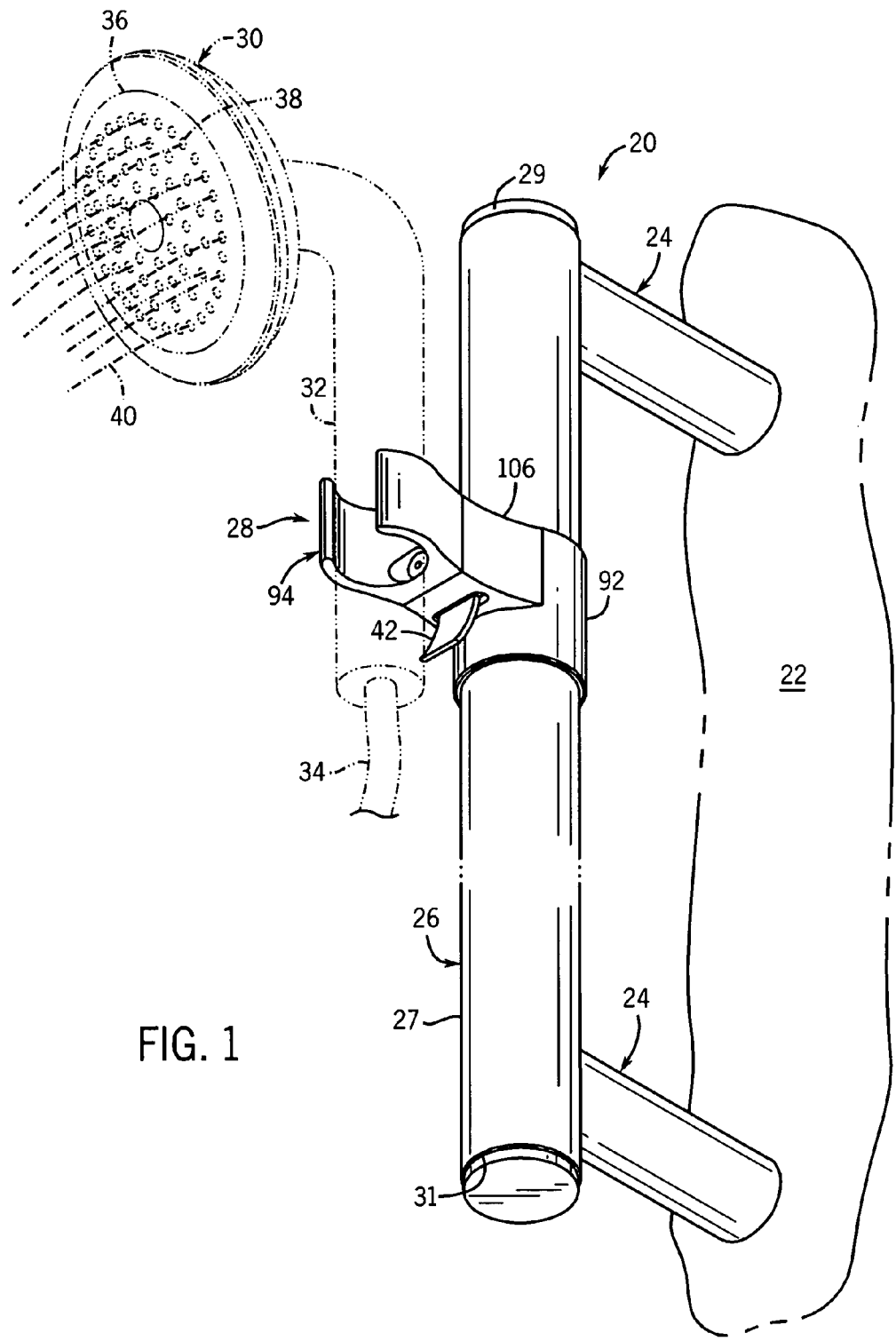
FIG. 1 is a perspective view of a slide bar assembly of the present invention, shown coupled to a handshower.

Referring first to FIGS. 1 and 2, a slide bar assembly 20 is mounted on a vertical extending wall 22 of a shower enclosure. Slide bar assembly 20 can be made of any suitable material known to a skilled artisan suitable for a water environment, and includes a longitudinally extending slide bar 26 having a cylindrical wall 27 extending between upper and lower ends 29 and 31, respectively. Slide bar 26 is supported at its terminal ends 29 and 31 by laterally extending wall mounting assemblies 24. Each mounting assembly 24 is configured to easily mount slide bar 26 to wall 22.

Slide bar 26 supports a bracket assembly 28 that can carry a conventional removable handheld showerhead 30. See e.g. the showerhead of U.S. Pat. No. 6,453,486. The showerhead 30 may include a tubular handle 32 that receives supply water from a flexible conduit 34, and delivers the water to a spray face 36. An array of nozzles 38 is formed in spray face 36 to deliver the supply water as a directed spray 40 in the shower enclosure.

Tubular handle 32 can be removed from bracket assembly 28 in the usual manner when the user wishes to hold the showerhead 30 to manually direct the corresponding spray 40. Alternatively, when the user wishes to mounted showerhead 30 to the wall, the height of showerhead 30 can be adjusted via bracket assembly 28 which is vertically slidable along slide bar 26.

To this end, bracket assembly 28 includes a trigger 42 that can be depressed by the user along the direction of arrow A, thereby enabling the user to raise bracket assembly 28 along the direction of arrow B (raised position shown in phantom lines in FIG. 2) or lower bracket assembly 28 along the direction of arrow C (lowered position shown in phantom lines in FIG. 2). Trigger 42 is then released to lock the vertical position of bracket assembly 28 on slide bar 26.

Mounting assemblies 24 will now be described with reference to FIGS. 2-4, it being appreciated that the mounting assembly 24 connected to the upper end 29 of slide bar is constructed symmetrically with respect to the mounting assembly 24 connected to the lower end 31 of slide bar. Accordingly, only the mounting assembly 24 connected to lower end 31 is described in detail herein. For the purposes of this description, the term "laterally inward" and "laterally outward" refer to a direction toward and away from wall 22, respectively.

Mounting assembly 24 includes an elongated, tubular sleeve 44 extending laterally between wall 22 and slide bar 26. Specifically, sleeve 44 is a hollow member having a mostly closed outer end 48 interfacing with wall 22, and a mostly open inner end 50 disposed opposite outer end 48. A substantially cylindrical aperture 52 extends laterally through the outer end 48 and is sized to receive the shaft of a screw 54 while preventing the screw head from passing through.

Screw 54 can thus be fastened to wall 22. Open inner end 50 defines a lip 51 having a curved contour to match the curvature of cylindrical wall 27. Sleeve 44 defines a radial step 53 disposed proximal open inner end 50 that defines a diameter slightly less than the diameter of open inner end 50.

A connector 56 extends laterally between slide bar 26 and sleeve 44. Connector 56 includes an outer cylindrical section 58 configured to be threadedly inserted into step 53. Connector 56 further includes a shoulder 60 disposed adjacent cylindrical section 58 that has a diameter slightly less than the diameter of open inner end 50, but greater than the diameter of step 53, such that shoulder 60 provides a stop that prevents connector 56 from being fully inserted into sleeve 44. Connector 56 is thus threadedly inserted into sleeve 44 until shoulder 60 abuts step 53. In this position, shoulder 60 is recessed with respect to lip 51.

Connector 56 further includes a cylindrical throat 62 disposed laterally outward from shoulder 60, and a cylindrical head 64 disposed laterally outward from throat 62. Head 64 has a diameter substantially equal to that of throat 62, and is configured to be engaged by a flathead screwdriver to insert cylindrical section 58 into sleeve 44.

A cylindrical neck 66 is disposed between throat 62 and head 64, and has a reduced diameter with respect to that of throat 62 and head 64. An aperture 68 extends laterally through cylindrical wall 27, and is configured for alignment with aperture 52. Slide bar 26 is hollow at the region of aperture 68, which is sized to snugly receive head 64, cylindrical neck 66, and throat 62.

Mounting assembly 24 further includes a longitudinally extending end cap assembly 71 installed in slide bar 26. For the purposes of this description, the terms "above" and "below" refer to directions when slide bar 26 is in the vertical orientation illustrated in FIG. 1. The terms "vertical" and "longitudinal" are thus used synonymously throughout this description for the purposes of clarity and convenience, it being appreciated that the principles of the present invention are applicable regardless of the orientation of slide bar 26, and the present invention is not intended to be limited to the specific orientation illustrated and described herein.

End cap assembly 71 includes a cylindrical guide slug 70 having an outer diameter sized to fit inside slide bar 26. Slug 70 has a closed lower end 75 and an aperture 74 extending vertically through lower end 75. A laterally directed, substantially cylindrical, channel 72 extends radially through slug 70.

Slug 70 is inserted vertically into lower end 31 of slide bar 26 such that channel 72 is in lateral alignment with aperture 68. In this position, lower end 75 is disposed above lower end 31 of slide bar 26. A radial notch 73 is formed in slug 70 proximal its lower end, and receives an o-ring 76 that provides a seal between slug 70 and slide bar 26. Once guide slug 70 is installed in slide bar 26, throat 62, cylindrical neck 66, and head 64 are inserted through aperture 68 and channel 72 until lip 51 abuts cylindrical wall 27. In this position, head 64 is substantially flush with respect to the laterally outer end of channel 72, and cylindrical neck 66 is vertically aligned with aperture 74.

End cap assembly 71 further includes a set screw 80 configured to be threadedly inserted (alternatively friction fit) vertically into aperture 74. Set screw 80 has a tapered upper end 81 that is sized to fit snugly inside cylindrical neck 66 between head 64 and throat 62 of connector 56. Set screw 80 and slug 70 thus provide a locking mechanism that fixes the position of connector 56 with respect to lateral movement relative to slide bar 26.

Finally, an end cap 82 is provided having a cylindrical neck 86 configured to be friction fit (alternatively threaded) into lower end 31 of slide bar 26. A radial notch 83 is formed in neck 86 and receives an o-ring that provides a seal with respect to slide bar 26. End cap member 82 further includes a lower cylindrical head 85 that abuts lower end 31 when end cap member 82 is fully inserted into slide bar 26.

Figure 5:
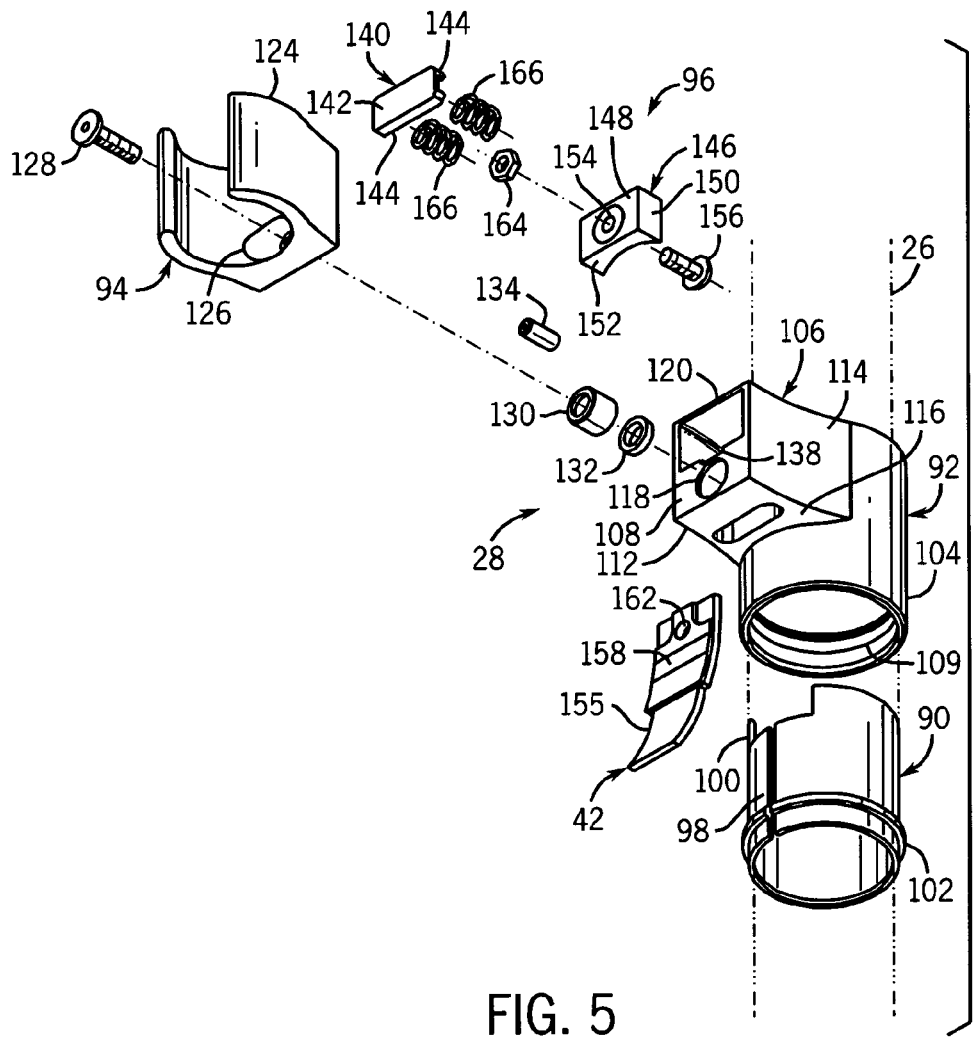
FIG. 5 is an exploded perspective view of a bracket assembly of FIG. 1.

Referring now to FIGS. 2, 5, and 6, bracket assembly 28 includes a slider member 92 that carries a clamp 94. Slider member 92 receives a cylindrical sleeve 90 configured to travel along slide bar 26. A trigger-responsive brake assembly 96 releasably connects clamp 94 to slide bar 26.

Sleeve 90 is a vertically extending tubular member having an inner diameter only slightly greater than the diameter of slide bar 26. A slot 98 extends vertically through sleeve 90 to assist in sliding sleeve 90 over slide bar 26. A rectangular pocket 100 is formed in the laterally outer side of the upper end of sleeve 90, and a flange 102 extends radially outward from the lower end of sleeve 90.

Slider member 92 includes a vertically extending cylindrical neck 104 that has an inner diameter slightly greater than the outer diameter of sleeve 90 such that sleeve 90 is received by neck 104. A radial notch 109 is formed in the lower end of neck 104 that receives flange 102 to lock sleeve 90 in neck 104 with respect to vertical movement.

A generally rectangular block 106 extends laterally outward from the upper end of neck 104. Block 106 includes a front face 108, opposing upper and lower walls 110 and 112, respectively, and opposing curved side walls 114 extending between neck 104 and front face 108. An oval-shaped cutout 116 extends vertically through lower wall 110, and is elongated in the transverse direction (i.e., a direction perpendicular to both the longitudinal and lateral directions).

A substantially circular cutout 118 extends laterally through the lower end of front face 108, and a rectangular cutout 120 extends through front face 108 at a location above circular cutout 118. Rectangular cutout 120 is aligned with pocket 100 of sleeve 90, such that an exposed portion of outer cylindrical wall 27 of slide bar 26 is aligned with cutout 120.

Clamp 94 includes a vertically extending base 122 and opposing curved arms 124 extending laterally outward from base 122. Curved arms 124 are flexible to engage tubular handle 32 of showerhead 30 in the manner described above. A beveled aperture 126 extends through base 122 and is sized to receive the shaft of a screw 128. Screw 128 extends through cutout 118, and is further inserted into a collar 130 and a washer 132 disposed laterally inward with respect to collar 130.

Washer 132 and collar 130 are supported by a laterally inwardly facing seat 135 that is formed inside block 106. Seat 135 defines a threaded aperture 137 that receives screw 128. Washer 132 and collar 130 are laterally spaced such that base 122 abuts front face 108 when screw 128 is fully inserted.

Screw 128 is sufficiently tightened to provide a frictional force that prevents clamp 94 from rotating during normal operation. In addition, a cylindrical sleeve 134 extends between a collar and rectangular block 106 at a location above screw 128 to further prevent rotation of clamp 94 during normal operation. Specifically, a pin 136 extends laterally inward from base 122. Pin 136 is inserted into the laterally outer end of sleeve 134.

The laterally inner end of sleeve 134 is seated in a rectangular notch 138 formed at the lower end of rectangular cutout 120. Notch 138 receives with pin 136 to prevent rotation of clamp 94. Prior to installation of clamp 94, however, brake assembly 96 is first coupled to block 106 and retained by clamp base 122.

Brake assembly 96 includes a brake pad 146 having a flat base 148 and a pair of opposing brake arms 150 that extend laterally inward from the outer ends of base 148. Brake arms 150 are connected by opposing upper and lower walls 152 whose laterally inner ends are curved to match the curvature of cylindrical wall 27. Brake pad 146 is made of any material suitable (for example a natural rubber or a synthetic rubber such as neoprene) for preventing bracket assembly 28 from sliding along slide bar 26 when brake pad 146 is biased against slide bar 26. A centrally disposed, generally cylindrical, aperture 154 extends laterally through base 148, and is sized to receive the shaft of a laterally outwardly extending screw 156.

Trigger 42 includes a substantially rectangular plate 155 having a radius of curvature about a transverse extending axis. Body thus defines a laterally outer surface 158 that is inwardly curved to provide engagement surface for the user, and an opposing outwardly curved laterally inner surface 160. A transversely centered aperture 162 extends laterally through the upper end of trigger 42, which is inserted vertically through oval cutout 116 until apertures 162 and 154 are in lateral alignment.

Screw 156 is thus partially inserted into aperture 154 of brake pad 146, which is then inserted into rectangular cutout 120 such that curved walls 152 face slide bar 26. Trigger 42 is then inserted into cutout 116 such that plate 154 is disposed laterally outward from brake pad 146. Screw 156 is inserted through aperture 162, and is fastened by a nut 164 to connect trigger 42 and brake pad 146. The lower end of trigger 42 extends down from cutout 116 and defines a user-actuated surface.

Brake assembly 96 further includes a laterally outwardly facing "c" shaped spring seat 140 disposed laterally outward from brake pad 146. Spring seat 140 includes a transversely elongated flat rectangular base 142 and opposing elongated arms 144 that extend laterally inward from the upper and lower ends of base 142. A pair of spring members 166 extends between the upper end of trigger 42 and spring seat base 142.

Bracket assembly 28 is assembled by inserting screw 156 through aperture 154 of brake pad 146, and placing brake pad into rectangular cut-out 120. Trigger 42 is then inserted into oval-shaped cutout 116 to place apertures 154 and 162 in alignment. Screw 156 is thus further inserted through aperture 162 and fastened with nut 164. Spring seat 140 is then placed adjacent brake pad 146 such that springs 166 extend between base 142 and the upper end of trigger 42.

Spring seat base 142 is positioned adjacent clamp base 122. Clamp 94 is then installed by placing washer 132 and collar 130 against seat 135, and by placing the sleeve 134 in a rectangular notch 138. Screw 128 is then threadedly inserted into aperture 137 to fasten clamp 94 to block 106.

Referring also to FIG. 1, once bracket assembly 28 has been assembled, spring seat 140 rests against clamp base 122, and springs 166 bias brake pad 146 against slide bar 26 (in pocket 100) with sufficient force to prevent vertical movement of clamp 94 along slide bar 26. When the user wishes to adjust the vertical position of clamp, he or she can depress the lower exposed end of trigger 42, causing the upper end of trigger to bias brake pad 146 laterally outwards against the force of springs 166 and away from slide bar 26.

Advantageously, bracket assembly is configured such that the user can easily grasp slider member 92 while using his or her thumb to depress the lower end of trigger 42. With brake pad 146 disengaged from slide bar 26, the vertical position of slider member 92 can be adjusted as desired. To lock the vertical position of slider member 92, trigger 42 is released, thereby causing springs 166 to bias brake pad 146 against slide bar 26.

Figure 7:
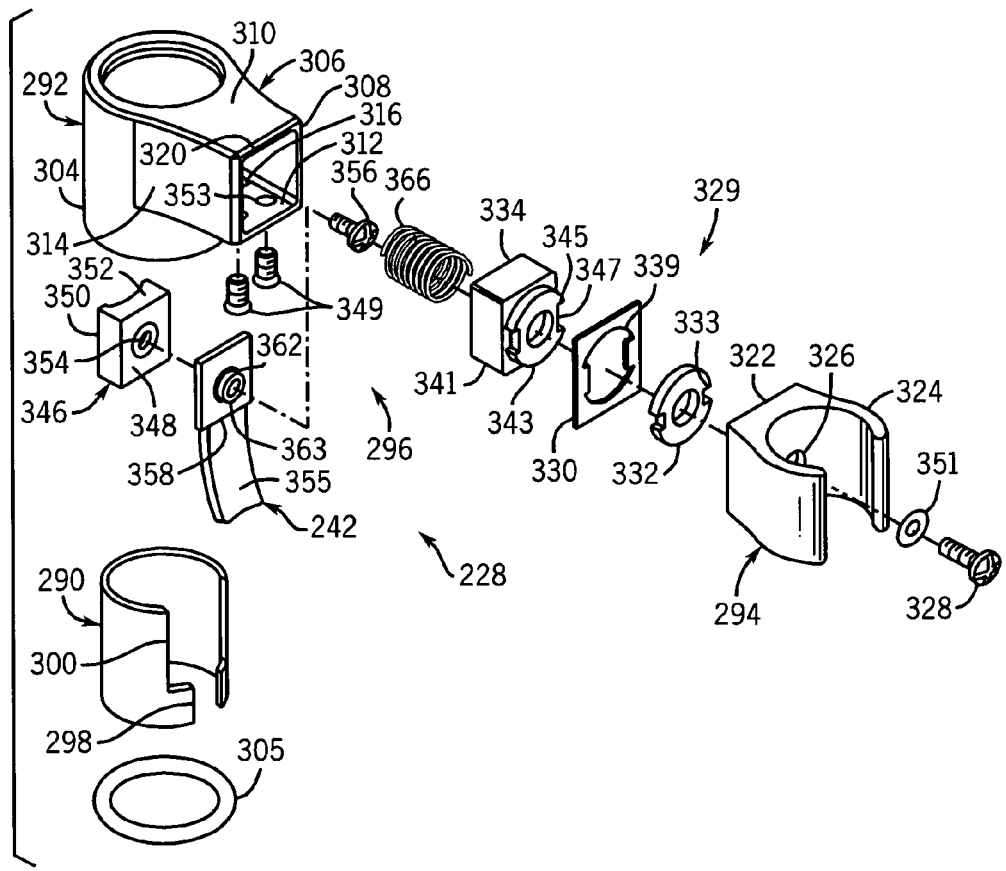
FIG. 7 is an exploded perspective view of an alternative bracket assembly.

Referring now to FIG. 7, bracket assembly 228 is illustrated having components corresponding to like elements of bracket assembly 28 incremented by 200 for the purposes of clarity and convenience. As described above, bracket assembly 228 can be installed in slide bar assembly 20 as an alternative to bracket assembly 28.

Bracket assembly 228 includes a slider member 292 that carries a clamp 294. Slider member 292 further receives a cylindrical sleeve 190 configured to travel along slide bar 26. A trigger-responsive brake assembly 296 releasably connects clamp 294 to slide bar 26. The components of bracket assembly 228 will now be described.

Sleeve 290 is a vertically extending tubular member having an inner diameter substantially equal to the diameter of slide bar 226. A slot 298 extends vertically through sleeve 290 to assist in sliding sleeve 290 over slide bar 26. A rectangular pocket 300 is formed in the laterally outer side of the upper end of sleeve 290.

Slider member 292 includes a vertically extending cylindrical neck 304 that has an inner diameter substantially equal to (or slightly greater than) the outer diameter of sleeve 290 such that sleeve 290 is received by neck 304. An o-ring 304 is also provided.

A generally rectangular block 306 extends laterally outward from the upper end of neck 304. Block 306 includes a front face 308, opposing upper and lower walls 310 and 312, respectively, and opposing curved side walls 314 extending between neck 304 and front face 308. An oval-shaped cutout 316 extends vertically through lower wall 310, and is elongated in the transverse direction (i.e., a direction perpendicular to both the longitudinal and lateral directions). A rectangular cutout 320 extends laterally through the lower end of front face 308, and is aligned with pocket 100 of sleeve 90, such that an exposed portion of outer cylindrical wall 27 of slide bar 26 is aligned with cutout 320.

Clamp 294 includes a vertically extending base 322 and opposing curved arms 324 extending laterally outward from base 222. Curved arms 324 are flexible to engage tubular handle 32 of showerhead 30 in the manner described above. A substantially cylindrical aperture 326 extends through base 322 and is sized to receive the shaft of a screw 328 that connects clamp 294 to a clamp mounting assembly 329.

Clamp mounting assembly 329 includes a rubber washer 332, a spacer member 330, and is threadedly inserted in an insert 334. Rubber washer 332 is substantially annular having radial keys 333 configured to mate with notches (not shown) carried by base 322 to prevent rotation of clamp 294 relative to washer 332. Spacer member 330 is a generally rectangular body defining a keyed cutout 339 configured to mate with insert 334 to prevent rotation of spacer member 330 relative to cutout 339.

Specifically, insert 334 includes a generally rectangular housing 341 having a generally cylindrical head 343 extending laterally outward from housing 341. A pair of opposing notches 345 is formed in head 343 that are configured to receive keyed cutout 339 of spacer member 330. A centrally disposed cylindrical neck 347 extends laterally outward from head 343 that is sized to receive annular washer 332.

Screw 328 thus extends through aperture 326, and fastens clamp 294, washer 332, spacer member 330, and insert 334. Clamp mounting assembly 329 is inserted into rectangular cutout 320 such that block 306 locks insert 334 and spacer member 330 with respect to rotational movement. Clamp 294 is thus prevented from rotating relative to slider member 292.

A pair of screws 349 extends through a corresponding pair of cylindrical apertures extending through lower wall 312. Each screw is threadedly inserted into apertures (not shown) extending into the base of insert 334 in order to fasten clamp locking assembly 329 to block 306. Prior to installation of clamp 294, however, brake assembly 296 is first coupled to block 306.

Brake assembly 296 includes a brake pad 346 having a flat base 348 and a pair of opposing brake arms 350 (one shown) that extend laterally inward from the outer ends of base 348. Brake arms 350 are connected by opposing upper and lower walls 352 (only upper wall shown) whose laterally inner ends are curved to match the curvature of cylindrical wall 27. Brake pad 346 is made of any material suitable (for example a natural rubber or a synthetic rubber such as neoprene) for preventing bracket assembly 228 from sliding along slide bar 26 when brake pad 346 is biased against slide bar 26. A centrally disposed, generally cylindrical, aperture 354 extends laterally through base 348.

A trigger 242 includes a substantially rectangular plate 355 having a radius of curvature about a transverse extending axis. Body thus defines a laterally outer surface 358 that is inwardly curved to provide engagement surface for the user, and an opposing outwardly curved laterally inner surface 360. A transversely centered aperture 362 extends laterally through a laterally outwardly facing cylindrical reinforcement 363 disposed at the upper end of trigger 242.

Brake pad 346 is inserted into cutout at a location laterally inward with respect to cutout 316. The upper end of trigger 242 is inserted vertically through oval cutout 316 until apertures 362 and 354 are in lateral alignment. A screw 356 is inserted through aperture 362 and is threadedly inserted into aperture 354 to connect trigger 242 and brake pad 346. A spring member 366 extends between the reinforcement 363 of trigger 242 and the laterally inner end of insert 334. Insert 334 thus provides a spring seat that causes spring member 366 to bias brake pad 346 against slide bar 26 (in pocket 300) with sufficient force to prevent vertical movement of clamp 94 along slide bar 26.

When the user wishes to adjust the vertical position of clamp, he or she can depress the lower exposed end of trigger 242, causing the upper end of trigger to bias brake pad 346 laterally outwards against the force of spring member 366 and away from slide bar 26. Advantageously, bracket assembly is configured such that the user can easily grasp slider member 292 while using his or her thumb to depress the lower end of trigger 242. With brake pad 346 disengaged from slide bar 26, the vertical position of slider member 292 (and hence bracket 294) can be adjusted as desired. To lock the vertical position of slider member 292, trigger 242 is released, thereby causing spring 266 to bias brake pad 246 against slide bar 26.

It should be appreciated that merely preferred embodiments of the invention have been described above. However, many modifications and variations to the preferred embodiments will be apparent to those skilled in the art, which will be within the spirit and scope of the invention. Therefore, the invention should not be limited to the described embodiments. To ascertain the full scope of the invention, the following claims should be referenced.

INDUSTRIAL APPLICABILITY

The invention provides a shower slide bar assembly having a bracket assembly configured to retain a handheld showerhead.

We claim:

1. A slide bar assembly comprising a longitudinally extending slide bar supporting a movable bracket assembly that is suitable to removably retain a showerhead, wherein the bracket assembly comprises:
    a slider member receiving the slide bar;
    a holder supported by the slider member, the holder being configured so as be suitable to removably receive the showerhead; and
    a brake assembly coupled to the slider member, the brake assembly including 1) a brake pad biased against the slide bar under a biasing force to inhibit the slider member from translating longitudinally along the slide bar when in a brake position, and 2) a trigger having first end defining an actuating surface and a second end linked to the brake pad;
    wherein a spring member is positioned to provide the biasing force, with the spring member being seated against the second end of the trigger adjacent the brake pad; and
    wherein the first end can be depressed to cause the second end to move the brake pad away from the slide bar, thereby freeing the slider member to translate longitudinally along the slide bar.

2. The slide bar assembly as recited in claim 1, wherein the slider member receives a separate sleeve that is fixed with respect to longitudinal movement relative to the slider member, the sleeve receiving the slide bar and having a vertically extending slot therethrough.

3. The slide bar assembly as recited in claim 2, wherein the sleeve defines a pocket extending there through, the pocket being in alignment with the brake pad such that the brake pad engages the slide bar through the pocket.

4. The slide bar assembly as recited in claim 1, wherein the bracket assembly further comprises an block supported by the slider member, and the brake assembly is coupled to the block.

5. The slide bar assembly as recited in claim 4, wherein the block defines a cutout extending laterally there through, the cutout receiving the brake pad and the spring member.

6. The slide bar assembly as recited in claim 5, wherein the spring member is seated against a spring seat.

7. A slide bar assembly comprising a longitudinally extending slide bar supporting a movable bracket assembly that is suitable to removably retain a showerhead, wherein the bracket assembly comprises:
    a slider member receiving the slide bar;
    a holder supported by the slider member, the holder being configured so as be suitable to removably receive the showerhead; and
    a brake assembly coupled to the slider member, the brake assembly including 1) a brake pad biased against the slide bar under a biasing force to inhibit the slider member from translating longitudinally along the slide bar when in a brake position, and 2) a trigger having first end defining an actuating surface and a second end linked to the brake pad;
    wherein the first end can be depressed to cause the second end to move the brake pad away from the slide bar, thereby freeing the slider member to translate longitudinally along the slide bar;
    wherein the bracket assembly further comprises an block supported by the slider member, and the brake assembly is coupled to the block;
    wherein the block defines a cutout extending laterally there through, the cutout receiving the brake pad and at least one spring member providing the biasing force;
    wherein the spring member is seated against a spring seat; and
    wherein the holder is fastened to the block, and the spring seat is retained by the holder.

8. The slide bar assembly as recited in claim 7, wherein the spring is further seated against the second end of the trigger.

9. The slide bar assembly as recited in claim 8, wherein the first end of the trigger is actuated in a direction toward the slide bar to force the second end of the trigger away from the slide bar.

10. The slide bar assembly as recited in claim 1, further comprising a wall mounting assembly suitable for connecting the slide bar assembly to a shower enclosure wall, the mounting assembly comprising:
    a sleeve mountable onto the wall, the sleeve having a first distal end disposable adjacent the wall and a second distal end disposed opposite the first distal end;
    a connector fastened to the sleeve at a first connector end and extending partially into the slide bar at a second connector end opposite the first connector end such that the second distal end is disposed adjacent the slide bar; and
    a locking mechanism disposed inside the slide bar, the locking mechanism configured to fix the second end of the connector with respect to lateral movement relative to the slide bar; and
    wherein the slide bar has a hollow section closed by an end cap assembly, the locking mechanism comprising a set screw, the set screw being accessible when the end cap assembly is removed from the slide bar.

11. A slide bar assembly having a slide bar suitable for supporting a removable showerhead, the slide bar assembly having a wall mounting assembly suitable for connecting the slide bar assembly to a shower enclosure wall, the mounting assembly comprising:
    a sleeve mountable onto the wall, the sleeve having a first distal end disposable adjacent the wall and a second distal end disposed opposite the first distal end;
    a connector fastened to the sleeve at a first connector end and extending partially into the slide bar at a second connector end opposite the first connector end such that the second distal end is disposed adjacent the slide bar; and
    a locking mechanism disposed inside the slide bar, the locking mechanism configured to fix the second end of the connector with respect to lateral movement relative to the slide bar;
    wherein the slide bar has a hollow section closed by an end cap assembly, the locking mechanism comprising a set screw, the set screw being accessible when the end cap assembly is removed from the slide bar.

12. The slide bar assembly as recited in claim 11, wherein the slide bar has an essentially round outer surface and the second distal end of the sleeve is curved to fit against the slide bar outer surface.

13. The slide bar assembly as recited in claim 11, wherein the sleeve comprises an inwardly extending step formed inside the sleeve and the first connector end is threadedly inserted into the step.

14. A slide bar assembly having a slide bar suitable for supporting a removable showerhead, the slide bar assembly having a wall mounting assembly suitable for connecting the slide bar assembly to a shower enclosure wall, the mounting assembly comprising:
    a sleeve mountable onto the wall, the sleeve having a first distal end disposable adjacent the wall and a second distal end disposed opposite the first distal end;
    a connector fastened to the sleeve at a first connector end and extending partially into the slide bar at a second connector end opposite the first connector end such that the second distal end is disposed adjacent the slide bar; and
    a locking mechanism disposed inside the slide bar, the locking mechanism configured to fix the second end of the connector with respect to lateral movement relative to the slide bar;
    wherein the sleeve comprises an inwardly extending step formed inside the sleeve and the first connector end is threadedly inserted into the step; and
    wherein the connector further comprises a radial shoulder disposed adjacent the first connector end, the radial shoulder sized to abut the step when the connector is fully inserted in the sleeve.

15. The slide bar assembly as recited in claim 14, wherein the shoulder is recessed with respect to the second distal end of the sleeve when the connector is fully inserted in the sleeve.

16. The slide bar assembly as recited in claim 13, wherein the slide bar has an outer surface defining an aperture formed therein, and the locking mechanism further comprises a slug disposed in the slide bar, the slug defining a channel extending there through that is aligned with the aperture.

17. A slide bar assembly having a slide bar suitable for supporting a removable showerhead, the slide bar assembly having a wall mounting assembly suitable for connecting the slide bar assembly to a shower enclosure wall, the mounting assembly comprising:
    a sleeve mountable onto the wall, the sleeve having a first distal end disposable adjacent the wall and a second distal end disposed opposite the first distal end;
    a connector fastened to the sleeve at a first connector end and extending partially into the slide bar at a second connector end opposite the first connector end such that the second distal end is disposed adjacent the slide bar; and
    a locking mechanism disposed inside the slide bar, the locking mechanism configured to fix the second end of the connector with respect to lateral movement relative to the slide bar;
    wherein the sleeve comprises an inwardly extending step formed inside the sleeve and the first connector end is threadedly inserted into the step;
    wherein the slide bar has an outer surface defining an aperture formed therein, and the locking mechanism further comprises a slug disposed in the slide bar, the slug defining a channel extending there through that is aligned with the aperture; and
    wherein the second end of the connector includes a head sized to fit through the aperture and the channel.

18. The slide bar assembly as recited in claim 17, wherein the second end of the connector further comprises a neck disposed adjacent the head, and the locking mechanism further comprises a set screw sized to engage the neck.

19. A slide bar assembly configured to be mounted to a wall and support a showerhead, the slide bar assembly comprising:
    a longitudinally extending slide bar;
    a laterally extending mounting assembly connecting the slide bar to the wall, the mounting assembly comprising:
      i. a sleeve mounted onto the wall;
      ii. a connector fastened to the sleeve at a first connector end, and extending partially into the slide bar at a second connector end opposite the first connector end;
      iii. a locking mechanism disposed inside the slide bar, the locking mechanism configured to fix the second end of the connector with respect to lateral movement relative to the slide bar;
    wherein the slide bar has a hollow section closed by an end cap assembly, the locking mechanism comprising a set screw, the set screw being accessible when the end cap assembly is removed from the slide bar; and
    a bracket assembly extending laterally outwards from the slide bar, the bracket assembly comprising:
      i. a slider member configured to slide along the slide bar, the slider member supporting a clamp, the clamp being configured to removably retain the showerhead; and
      ii. a brake assembly releasably connecting the clamp to the slide bar, the brake assembly including a spring-loaded trigger connected at a first trigger end to a brake pad, the first trigger end being biased toward the slide bar under a spring force to correspondingly bias the brake pad against the slide bar to prevent longitudinal movement of the slider member along the slide bar, wherein the trigger is actuated at a second trigger end opposite the first end to bias the second trigger end against the spring force to remove the brake pad from the slide bar and permit the slider member to translate longitudinally along the slide bar.

* * * * *